(12) United States Patent
Tokuyama

(10) Patent No.: US 7,598,984 B2
(45) Date of Patent: Oct. 6, 2009

(54) IMAGE SIGNAL PROCESSING CIRCUIT

(75) Inventor: Katsumi Tokuyama, Ibaraki (JP)

(73) Assignee: Panasonic Corporation, Osaka (JP)

( * ) Notice: Subject to any disclaimer, the term of this patent is extended or adjusted under 35 U.S.C. 154(b) by 643 days.

(21) Appl. No.: 11/216,165

(22) Filed: Sep. 1, 2005

(65) Prior Publication Data

US 2006/0050305 A1    Mar. 9, 2006

(30) Foreign Application Priority Data

Sep. 7, 2004    (JP) ............................. 2004-259724

(51) Int. Cl.
*H04N 5/228* (2006.01)
(52) U.S. Cl. .................................. 348/222.1
(58) Field of Classification Search .............. 348/222.1; 358/1.15, 434, 409, 442, 426
See application file for complete search history.

(56) References Cited

U.S. PATENT DOCUMENTS

| | | | | |
|---|---|---|---|---|
| 4,953,011 A * | 8/1990 | Mori et al. | ..................... | 348/30 |
| 5,264,944 A * | 11/1993 | Takemura | ..................... | 386/38 |
| 5,905,531 A * | 5/1999 | Chiba | .......................... | 348/241 |
| 6,839,148 B1 * | 1/2005 | Matsuzoe et al. | .......... | 358/1.15 |
| 6,963,373 B2 * | 11/2005 | Imaizumi | ..................... | 348/312 |
| 7,136,581 B2 * | 11/2006 | Fujii | ............................ | 396/54 |
| 7,181,084 B2 * | 2/2007 | Jostschulte | .................. | 382/260 |
| 2005/0122408 A1 * | 6/2005 | Park et al. | ................. | 348/223.1 |
| 2005/0285961 A1 * | 12/2005 | Kokubo et al. | .............. | 348/312 |
| 2006/0078225 A1 * | 4/2006 | Pearson et al. | .............. | 382/286 |

FOREIGN PATENT DOCUMENTS

JP    5-233803 A    9/1993

* cited by examiner

*Primary Examiner*—Nhan T Tran
*Assistant Examiner*—Amy Hsu
(74) *Attorney, Agent, or Firm*—McDermott Will & Emery LLP

(57) ABSTRACT

An image signal processing circuit according to the present invention comprises an image signal processing unit, a line memory, a logic unit, an output pad and a data replacing unit. The image signal processing unit generates image data from an inputted image signal. The line memory temporarily memorizes the image data per line and outputs the memorized image data while switching to and from effective and ineffective. The logic unit generates digitally processed image data by digitally processing the image data outputted from the line memory. The output pad outputs the digitally processed image data. The data replacing unit generates dummy data and replaces data in a data region set as ineffective by the line memory among the image data outputted from the line memory or the digitally processed image data outputted from the logic unit with the dummy data.

8 Claims, 9 Drawing Sheets

F I G. 1
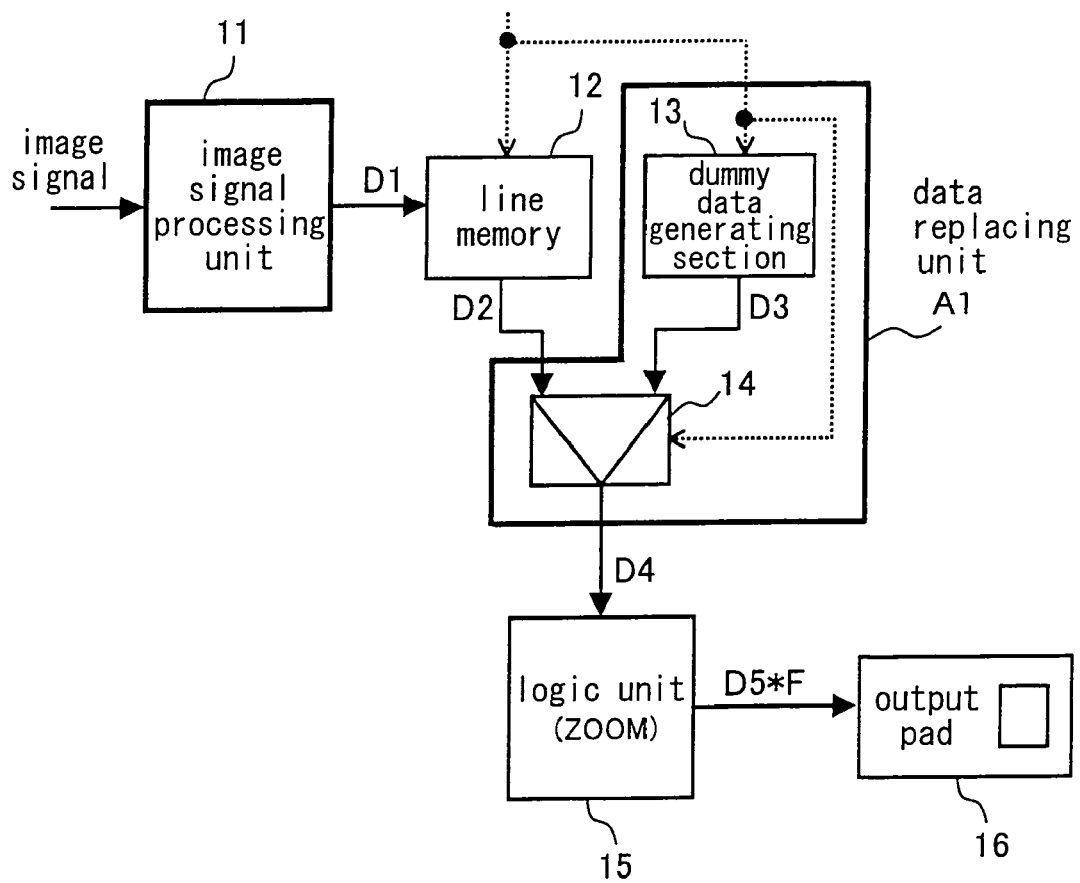

F I G. 4
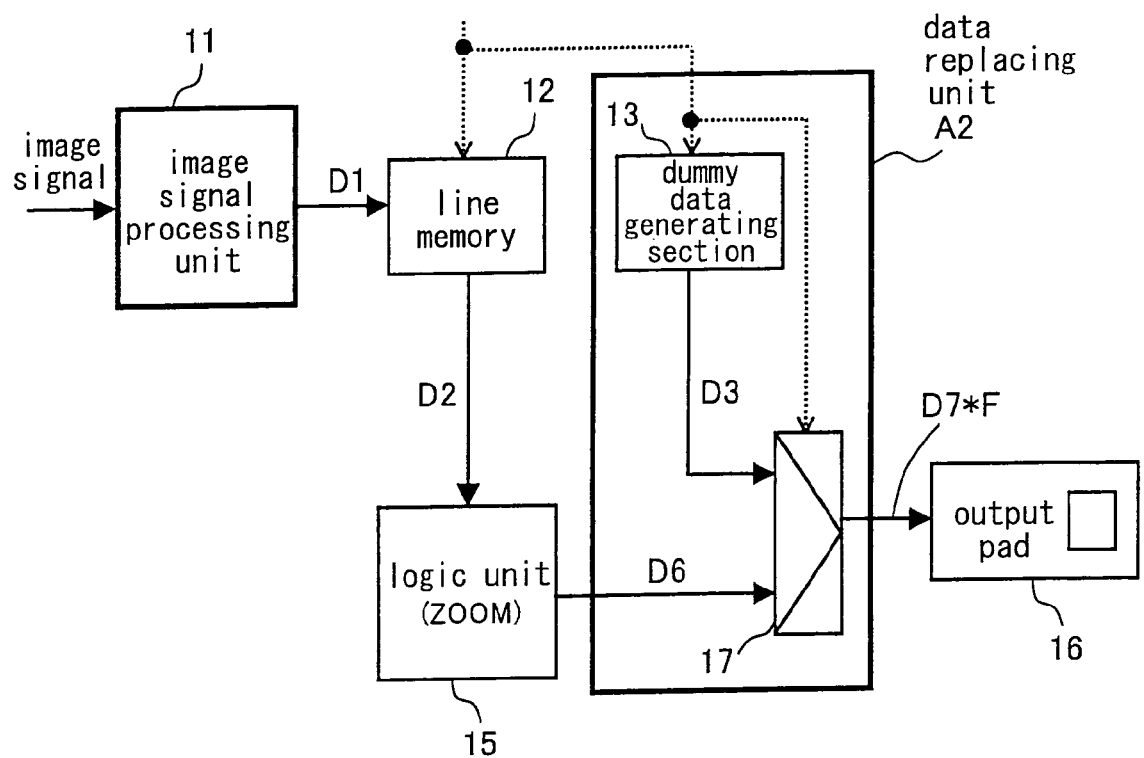

F I G. 6
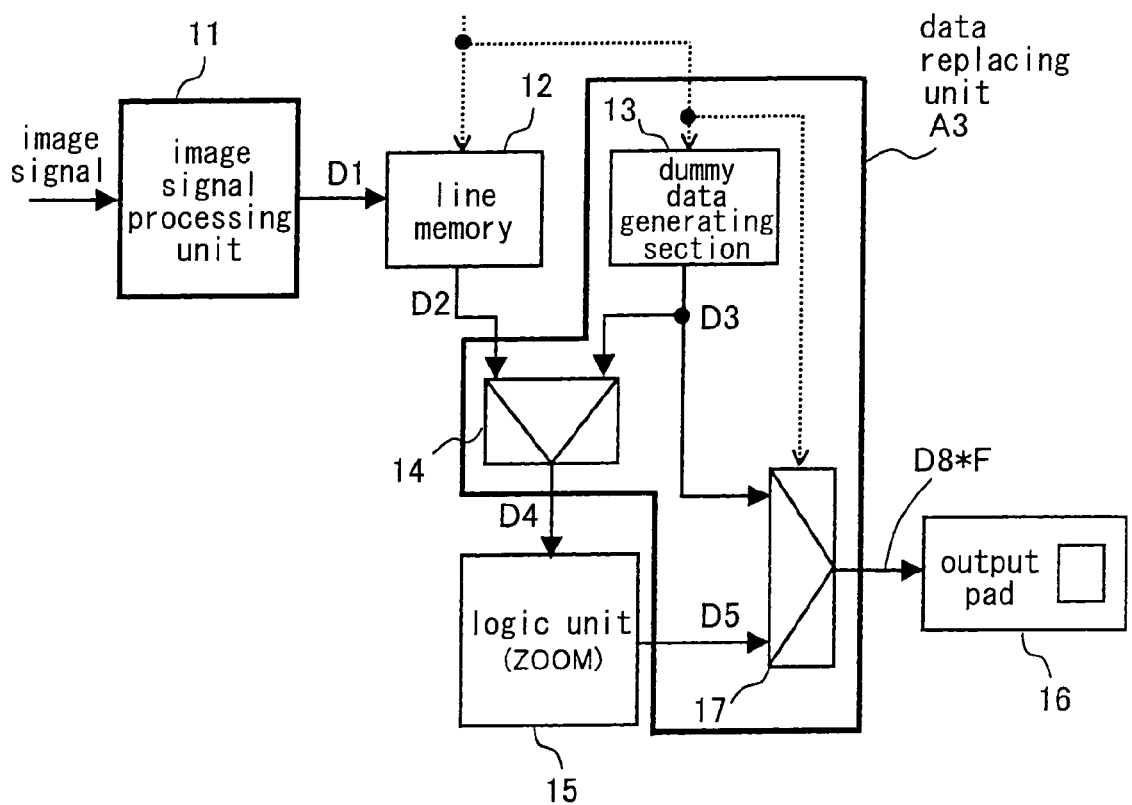

IMAGE SIGNAL PROCESSING CIRCUIT

BACKGROUND OF THE INVENTION

1. Field of the Invention

The present invention relates to a image signal processing circuit for inputting a image signal from an image sensor or the like, executing a signal processing to image data and outputting the processed image data to an external monitor or the like.

2. Description of the Related Art

In some cases, for example, an enlargement/reduction processing, such as digital zoom, may be executed to an image signal inputted from an image sensor. The enlargement/reduction processing can be executed to the image data in a state in which the image data is stored in SDRAM (Synchronous Dynamic Random Access Memory) in the case of a system comprising the SDRAM. However, in any system not comprising the SDRAM in terms of downsizing and cost reduction, a line memory is used so as to execute the digital zoom processing. More specifically, the line memory is used to selectively process only a line to be processed in a plurality of lines arrayed in parallel in a vertical direction.

FIG. 10 is a block diagram illustrating a schematic constitution of an image signal processing circuit for executing the conventional digital signal processing in the case of the system in which the SDRAM is not included. FIG. 11 is a timing chart for describing an operation of the circuit. In FIG. 11, a reference symbol HD denotes a horizontal synchronizing signal.

An image signal is inputted to an image signal processing unit 31 from an image sensor. The image signal processing circuit 31 generates image data (luminance signal Y, color-difference signals Cr and Db) based on the inputted image signal, and outputs the generated image data from to a line memory 32 comprising SRAM. The line memory 32 fetches the image data in a state in which all of line signals are effective (D31).

The line memory 32 changes an access timing in accordance with a preset zoom magnification. When the zoom magnification is set to ½, for example, an effective data region is reduced to half. The image data is outputted to a logic unit 33 per line while a switchover to and from an effective line and an ineffective line are switched is being executed (D32). The logic unit 33 executes an interpolation processing (zoom processing) based on a timing synchronizing with the inputted image data. The interpolated image data (D33) is outputted to an output pad 34 while the effective/ineffective switchover is being executed. The image data (D33) is outputted together with an effective/ineffective discrimination flag F. The image data (D33) is further outputted to an external monitor or the like from the output pad 34. In an external processing, the effective/ineffective discrimination flag F regards an "H" period as effective, and the image data can be thereby accurately fetched.

As a related conventional technology, No. 05-233803 of the Publication of the Unexamined Japanese Patent Applications discloses a method of reducing a noise by correcting a signal itself based on a correlation between inputted signals.

In a camera system in which the image sensor is used, a substrate is increasingly downsized and an analog circuit is increasingly formed into an on-chip structure. In response to the foregoing trend, there is a concern that an image quality may be deteriorated under the influence of the noise with respect to the analog circuit. FIG. 12 shows a constitution of LS140 in which an image signal processing circuit 30 and an analog circuit 35 shown in FIG. 10 are formed into a one-chip structure.

In the foregoing conventional method, the digital processing is executed to the image data changing per clock in the signal-effective line, while there is no power consumption in the signal-ineffective line because the data does not change. Therefore, a power consumption P is largely different between a signal-effective period and a signal-ineffective period. The large variation of the power consumption P in the image signal processing circuit 30 results in the noise, which is transmitted to the analog circuit 35 via a power-supply line and a GND line. Because the analog circuit 35 is easily affected by the noise, a density of the resulting image is different in each line as shown in FIG. 13 in the case of generating the large variation in the power consumption P in the image signal processing circuit 30.

For reference, in No. 05-238803 of the Publication of the Unexamined Japanese Patent Applications, a sufficient noise reduction cannot be expected because the signal causing the noise cannot be controlled.

SUMMARY OF THE INVENTION

Therefore, a main object of the present invention is to eliminate different densities generated in an image under the influence of a noise generated by a variation of power consumption in a digital signal processing.

In order to solve the aforementioned problem, an image signal processing circuit according to the present invention comprises an image signal processing unit for generating image data from an inputted image signal, a line memory for temporarily memorizing the image data per line and outputting the memorized image data while switching to and from effective and ineffective, a logic unit for digital-processing the image data outputted from the line memory and generating digitally processed image data, an output pad for outputting the digitally processed image data, and a data replacing unit for generating dummy data and replacing data in a data region set as ineffective by the line memory among the image data outputted from the line memory or the digitally processed image data outputted from the logic unit with the dummy data.

The image data from the image signal processing unit is temporarily memorized in the line memory per line, wherein the image data is handled as effective in all of the lines. The line memory outputs the image data while switching to and from effective and ineffective based on an instruction relating to the digital processing transmitted from outside. During an effective period, the effective image data is outputted from the line memory, while the image data from the line memory is ineffective during an ineffective period. The data replacing unit replaces the ineffective data with the dummy data. The replacement may be executed in the stage of inputting the image data to the logic unit or in the stage of outputting the image data from the logic unit.

In the foregoing image signal processing circuit, the data replacing unit is preferably constituted as in the following preferable modes.

The data replacing unit comprises a dummy data generating section for generating the dummy data and a selector for selecting the image data outputted from the line memory during an effective data region output period of the image data and outputting the selected image data to the logic unit, the selecting unit further selecting the dummy data during an ineffective data region output period of the image data and outputting the selected dummy data to the logic unit.

In the foregoing constitution, the selector selects the dummy data from the dummy data generating section during the ineffective data region output period and outputs the selected dummy data to the logic unit. The dummy data is different to the data in the ineffective data region in that a signal component of a certain level is included therein. Therefore, when the dummy data is digitally processed in the logic unit, a power consumption corresponding to the level is generated. The power consumption generated in digitally processing the dummy data in the logic unit is not very different to the power consumption in the case of the effective data region. As a result, the power consumption can be equalized so as to control the variation of the power consumption. Thereby, the noise can be averaged, which leads to the reduction of any adverse influence on an image quality.

As an alternative constitution, the data replacing unit comprises a dummy data generating section for generating the dummy data and a selector for selecting the digitally processed image data outputted from the logic unit during the effective data region output period of the digitally processed image data and outputting the selected digitally processed image data to the output pad, the selecting unit further selecting the dummy data during the ineffective data region output period of the digitally processed image data and outputting the selected dummy data to the output pad.

The digital processing of the dummy data in the logic unit leads to an additional power consumption, which is not favorable in terms of the reduction of the power consumption. The output pad consumes a certain degree of current (a few mA) in obtaining an interface with outside, wherein the variation of the consumption is estimated to be relatively large. Therefore, instead of replacing the data in the ineffective data region of the image data with the dummy data, the data in the ineffective data region of the digitally processed image data is replaced with the dummy data under the conditions that the adverse influence from the noise can be relatively reduced in digitally processing the ineffective data region in the logic unit. Accordingly, the data in the effective data region and the data in the ineffective data region of the image data outputted from the line memory are both inputted to the logic unit to be digitally processed therein. The data in the ineffective data region of the digitally processed image data outputted from the logic unit is replaced with the dummy data.

Thereby, the power consumption in the logic unit can be controlled preventing the digital processing executed by the logic unit from becoming a factor of the noise generation. Further, the noise resulting from the variation of the power consumption in the output pad can be reduced.

Further, the data replacing unit comprises a dummy data generating section for generating the dummy data, a first selector for selecting the image data outputted from the line memory during the effective data region output period of the image data and outputting the selected image data to the logic unit, the first selecting unit further selecting the dummy data during the ineffective data region output period of the image data and outputting the selected dummy data to the logic unit, and a second selector for selecting the digitally processed image data outputted from the logic circuit during the effective data region output period of the digitally processed image data and outputting the selected digitally processed image data to the output pad, the second selecting unit further selecting the dummy data during the ineffective data region output period of the digitally processed image data and outputting the selected dummy data to the output pad. Further, in a state in which the operation of one of the first and second selectors is activated, the operation of the other is fixed to a state in which the image data or the digitally processed image data is outputted.

The foregoing constitution corresponds to a combination of the preferable modes described earlier. When it is possible that the digital processing of the data in the ineffective data region in the logic unit fosters the noise generation, the first selector supplies the dummy data to the logic unit in place of the data in the ineffective data region. Then, the variation of the power consumption resulting from the digital processing of the data in the ineffective data region can be prevented from increasing. On the contrary, when it is not possible that the digital processing of the data in the ineffective data region in the logic unit fosters the noise generation, the second selector outputs the dummy data to the output pad in place of the data in the ineffective data region. Then, any unnecessary increase of the power consumption can be controlled by making the logic unit handle the ineffective data.

As an alternative constitution, a line memory control circuit is preferably further provided, wherein the line memory control circuit controls the output of the line memory so that the image data in the effective data region output period is interpolated by the image data in the ineffective data region output period. Thereby, the data replacing unit directly controls the line memory so that the ineffective data region can be interpolated by the effective data region in an adjacent line.

As an alternative constitution, the data replacing unit comprises the dummy data generating section, wherein the dummy data generating section preferably comprises a random pattern generating circuit for generating a random pattern, a counter for serially incrementing or decrementing a value, and a selector for selecting one of an output of the random pattern generating circuit and an output of the counter and outputting the selected output as the dummy data. Accordingly, a redundancy of the counter can be partly utilized. A wraparound of the noise may depend on the layout. Therefore, the selector is adapted to select the processing for adding the dummy data during the ineffective data region output period so as to realize the constitution in which only a necessary part can be used in terms of a system configuration.

The digitally processed image data preferably includes an effective/ineffective discrimination flag. Accordingly, an external device having received the digitally processed image data can accurately reproduce the image signal based on the effective/ineffective discrimination flag.

The logic unit preferably comprises an image enlarging/reducing function through the digital processing.

Because of a possibility that the image data includes the different densities due to a system delay in the signal processing, a processing same as the foregoing processing is preferably executed in a blanking period.

According to the present invention, any adverse influence resulting from the variation of the power consumption from the output pad to the analog circuit can be controlled and the image quality can be prevented from deteriorating such as the generation of the different densities in the image data even in the case of a camera system mounted on a small-size substrate or LSI in which the analog circuit has a system-on-chip structure.

Further, a circuit configuration corresponding to a constitution of the camera system can be reduced to a minimum level, and the increase of the power consumption can be also controlled to a minimum level. The image signal processing circuit according to the present invention has a function of improving the image quality in processing a signal inputted from an imaging element such as an image sensor, and is particularly effective for the LSI in which the analog circuit has the on-chip structure and the camera system mounted on the small-size substrate or the like.

BRIEF DESCRIPTION OF THE DRAWINGS

These and other objects as well as advantages of the invention will become clear by the following description of preferred embodiments and explicit in the appended claims of the invention. Many other benefits of the invention not recited in this specification will come to the attention of those skilled in the art upon implementing the present invention.

FIG. 1 is a block diagram illustrating a constitution of an image signal processing circuit according to an embodiment 1 of the present invention.

FIG. 4 is a block diagram illustrating a constitution of an image signal processing circuit according to an embodiment 2 of the present invention.

FIG. 6 is a block diagram illustrating a constitution of an image signal processing circuit according to an embodiment 3 of the present invention.

DETAILED DESCRIPTION OF THE INVENTION

Figure 2:
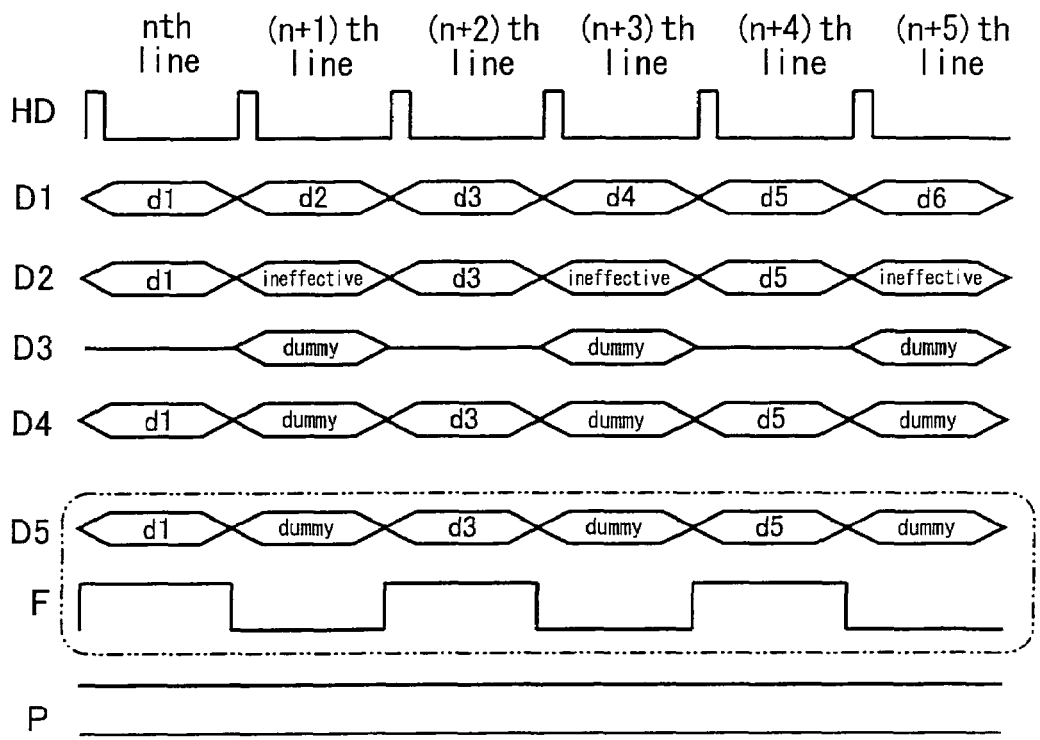
FIG. 2 is a timing chart of an operation of the image signal processing circuit according to the embodiment 1.

Hereinafter, preferred embodiments of the present invention are described referring to the drawings.

EMBODIMENT 1

FIG. 1 is a block diagram illustrating a constitution of an image signal processing circuit according to an embodiment 1 of the present invention. Referring to reference symbols shown in FIG. 1, 11 denotes an image signal processing unit (YC signal processing unit), 12 denotes a line memory having a SRAM configuration, A1 denotes a data replacing unit comprising a dummy data generating section 13 and a selector 14, 15 denotes a logic unit, and 16 denotes an output pad.

The image signal processing unit (YC signal processing unit) 11 generates image data D1 (luminance signal Y, color-difference signals Cr and Cb) based on an image signal from an image sensor. The line memory 12 fetches the image data D1 outputted from the image signal processing unit 11 and temporarily memorizes the fetched image data D1, and changes an access timing in accordance with a zoom magnification to thereby output effective/ineffective image data D2. The dummy data generating section 13 generates dummy data D3 different in each ineffective line (ineffective data region) and outputs the generated dummy data D3. The dummy data generating section 13 comprises, for example, a random pattern generating circuit.

The selector 14 selects one of the image data D2 from the line memory 12 and the dummy data D3 from the dummy data generating section 13. The selector 14 selects the image data D2 from the line memory 12 when detecting the effective line (effective data region) (effective data region output period), while selecting the dummy data D3 from the dummy data generating section 13 when detecting the ineffective line (ineffective data region) (ineffective data region output period).

The logic unit 15 fetches selected data D4 from the selector 14 and digitally processes (zoom processing) the fetched data D4, and appends an effective/ineffective discrimination flag F to digitally processed image data D5 thereby obtained and outputs the resulting data D5. The output pad 16 outputs the digitally processed image data D5 together with the effective/ineffective discrimination flag F. When the data and the flag are outputted, an interface between the output pad 16 and an external monitor or the like is obtained.

Next, an operation of the image signal processing circuit according to the present embodiment constituted as described is described referring to a timing chart of FIG. 2.

The image signal is inputted to the image signal processing unit 11 from the image sensor. The image signal processing circuit 11 generates the image data D1 based on the inputted image signal and outputs the generated data D1 to the line memory 12. The line memory 12 fetches the image data D1 from the image signal processing unit 11 per line in a state in which all of the lines are effective, and temporarily memorizes the fetched image data D1. The line memory 12 changes the access timing in accordance with the instructed zoom magnification. When the zoom magnification is, for example, ½, the line memory 12 outputs the image data D1 while switching to and from the effective line (effective data region) and the ineffective line (ineffective data region) per line (data region) to thereby generate the image data D2. The generated image data D2 is outputted from the line memory 12 to the selector 14. Comparing the effective data regions in the image data D2 and the image data D1 in one frame, the effective data region of the image data D2 is half of that of the image data D1.

The dummy data generating section 13 generates the dummy data D3 for each ineffective line (ineffective data region) and outputs the generated dummy data D3 to the selector 14. The generated dummy data D3 has different data contents in each ineffective line (ineffective data region). The selector 14 outputs the inputted dummy data D3 while switching to and from the effective line (effective data region) and the ineffective line (ineffective data region). The switchover is executed as follows. An effective/ineffective discrimination signal is supplied to the selector 14 from outside. The selector 14 detects an effective line output period or an ineffective line output period (effective data region output period/ineffective data region output period) based on the supplied effective/ineffective discrimination signal. The selector 14 selects the image data D2 from the line memory 12 and outputs the selected image data D2 when detecting the effective line output period (effective data region output period). The selector 14 selects the dummy data D3 from the dummy data generating section 13 and outputs the selected dummy data D3 when detecting the ineffective line output period (ineffective data region output period). Thus, the selected data D4 outputted from the selector 14 is supplied to the logic unit 15.

The following arrangement may be adopted instead of using the effective/ineffective discrimination signal. A bit pattern of the ineffective line (ineffective data region) is determined beforehand, and the selector 14 is provided with a function of judging the bit pattern. As a result of the arrangement, the selector 14 judges the bit pattern of each line (data region) and detects the ineffective line (ineffective data region) to thereby generate the selected data D4 based on a result of the detection.

The selected data D4 is inputted to the logic unit 15. The logic unit 15 executes the digital processing (interpolation) such as the zoom processing to the selected data D4 to thereby generate digitally processed image data D5. The digitally processed image data D5 has a pattern in which the effective data region and the dummy data are mixed. The logic unit 15b associates the digitally processed image data D5 with the effective/ineffective discrimination flag F and outputs the resulting image data D5 to the output pad 16. The output pad 16 further outputs the digitally processed image data D5 and the effective/ineffective discrimination flag F to the external monitor or the like. In the case of signal-processing the outputted digitally processed image data D5 outside, the digitally processed image data D5 is handled as the effective data during a period when the effective/ineffective discrimination flag F is "H" so that the image data can be accurately fetched.

Figure 3:
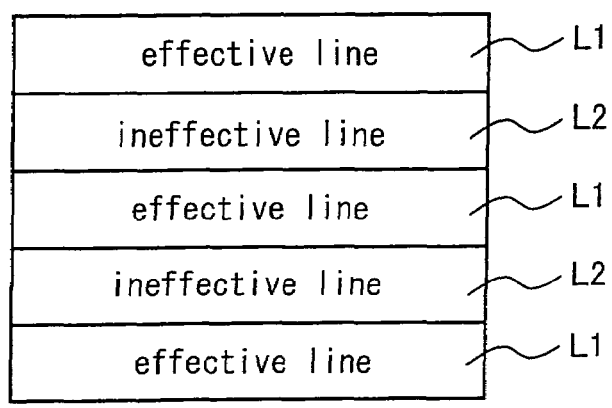
FIG. 3 is an illustration of an outputted image for describing the operation of the image signal processing circuit according to the embodiment 1.

In the conventional technology described earlier, the data in the ineffective line (ineffective data region) constantly includes certain contents. In contrast, the dummy data D3 of the present embodiment does not include certain contents, but include different contents in each line (data region). As a result, a variation of a power consumption P can be controlled and thereby equalized. More specifically, as shown in the image of FIG. 3, different densities possibly generated between an effective line L1 and an ineffective line L2 when the image is displayed can be controlled.

EMBODIMENT 2

A current of a few mA is applied to the output pad 16 so as to obtain the interface relative to the external device. Because of that, the variation of the power consumption in the output pad 16 is relatively large, which is a possible source of the noise generation. An embodiment 2 of the present invention is characterized in that an adverse influence on the output pad 16 due to the variation of the power consumption is controlled.

FIG. 4 is a block diagram illustrating a constitution of an image signal processing circuit according to the embodiment 2. A data replacing unit A2 according to the present embodiment comprises a dummy data generating section 13 and a selector 17. The dummy data generating section 13 has a constitution similar to that of the same component in the embodiment 1. The selector 17 switches to and from an output of a logic unit 15 and an output of the dummy data generating section 13 and outputs the selected output to an output pad 16. In the present embodiment, the selector for switching to and from the outputs of a line memory 12 and the dummy data generating section 13 is not provided. The logic unit 15 is directly supplied with image data D2 from the line memory 12. The selector 17 selects image data D6 of the logic unit 15 and the dummy data D3 of the dummy data generating section 13. Any other component in the present embodiment, which is similar to the corresponding component in the embodiment 1, is simply provided with the same reference symbol and not described here again.

Figure 5:
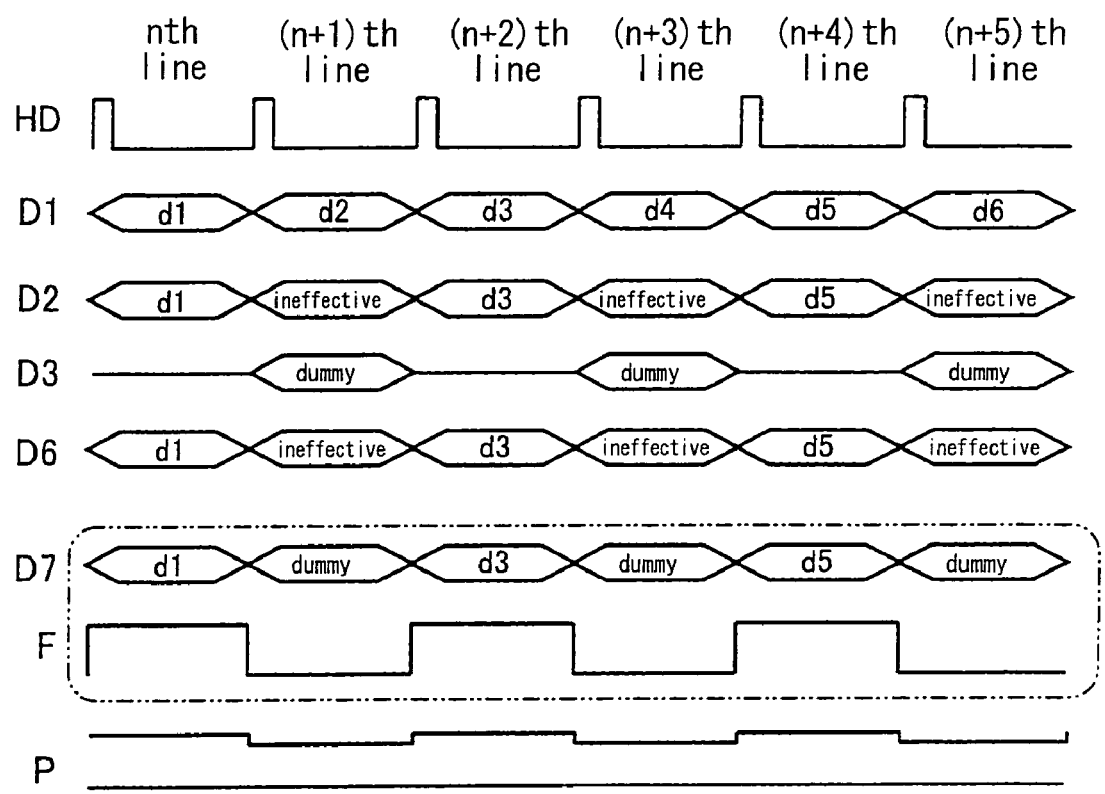
FIG. 5 is a timing chart of an operation of the image signal processing circuit according to the embodiment 2.

Next, an operation of the image signal processing circuit according to the present embodiment constituted as described is described referring to a timing chart of FIG. 5. The image data D2 is a signal in which the effective line (effective data region) and the ineffective line (ineffective data region) are alternately switched per line, and the image data D2 thus constituted is inputted to the logic unit 15. The logic unit 15 executes the digital processing (interpolation) such as the zoom processing thereto. The digitally processed image data D6 resulting from the processing has a pattern in which the effective data region and the ineffective data region are mixed. The digitally processed image data D6 obtained in the logic unit 15 is inputted to the selector 17. The selector 17 switches to and from the digitally processed image data D6 and the dummy data D3 and outputs the selected data. The switchover is executed as follows. The selector 17 is supplied with the effective/ineffective discrimination signal from outside. The selector 17 detects the effective line output period or the ineffective line output period (effective data region output period/ineffective data region output period) based on the supplied effective/ineffective discrimination signal. The selector 17 selects and outputs the digitally processed image data D6 when detecting the effective line output period (effective data region output period), while selecting and outputting the dummy data D3 when detecting the ineffective line output period (ineffective data region output period). Thus, selected data D7 outputted from the selector 17 is supplied to the output pad 16.

The selector 17 selects the digitally processed image data D6 when detecting the effective lien output period (effective data region output period) based on the effective/ineffective discrimination signal from outside, while selecting the dummy data D3 when detecting the ineffective line output period (ineffective data region output period). Further, the selector 17 generates the effective/ineffective discrimination flag F indicating whether or not the outputted data is effective, and associates the generated effective/ineffective discrimination flag F with the selected data to thereby output the resulting data as the digitally processed image data D7. The selector 17 outputs the digitally processed image data D7 to the output pad 16. The output pad 16 further outputs the digitally processed image data D7 to the external monitor or the like.

The present embodiment is effective when the variation of the power consumption in the logic unit 15 is as small as not affecting the analog circuit. The foregoing situation is possibly established depending on the layout. Though there is a little variation in power consumption P, the variation is not as large as affecting the image.

EMBODIMENT 3

In the embodiment 1, the logic unit 15 signal-processes the image data D4 including the dummy data per line. Because the dummy data includes a signal component of a certain magnitude, the digital processing of the dummy data demands the power. To put it differently, the variation of the power consumption P is controlled and thereby equalized because the dummy data consumes the power, which is, however, a disadvantage in an effort to reduce the power consumption. An embodiment 3 of the present invention is characterized in dealing with the disadvantage. The embodiment 3 corresponds to a combination of the embodiments 1 and 2.

FIG. 6 is a block diagram illustrating a constitution of an image signal processing circuit according to the embodiment 3. A data replacing unit A3 according to the present embodiment comprises a dummy data generating section 13, a first selector 14 and a second selector 17.

The dummy data generating section 13 has a constitution similar to that of the dummy data generating sections 13 in the embodiments 1 and 2. The first selector 14 switches to and from an output of a line memory 12 and an output of the dummy data generating section 13 and supplies the selected output to a logic unit 15. The second selector 17 switches to and from an output of the logic circuit 15 and the output of the dummy data generating section 13 and supplies the selected output to an output pad 16.

Any other component in the present embodiment, which is similar to the corresponding component in the foregoing embodiments, is simply provided with the same reference symbol and not described here again.

Figure 7:
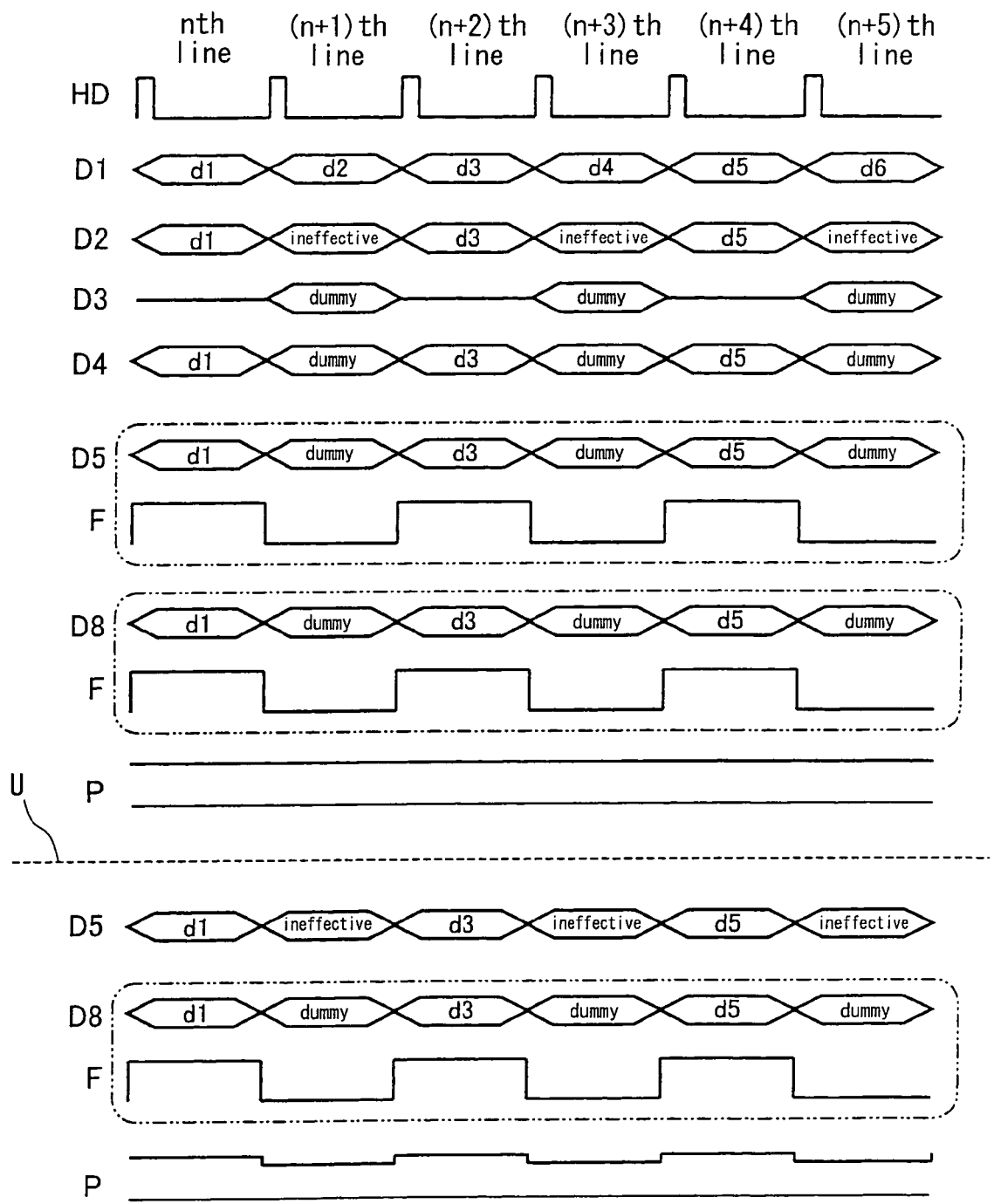
FIG. 7 is a timing chart of an operation of the image signal processing circuit according to the embodiment 3.

Next, an operation of the image signal processing circuit according to the present embodiment constituted as described is described referring to a timing chart of FIG. 7. In FIG. 7, an upper part from a dotted line U denotes an operation in which the first selector 14 is activated and the second selector 17 is inactivated, while a lower part from the dotted line U denotes an operation in which the second selector 17 is activated and the first selector is inactivated.

First, an operation in the situation in which the variation of the power consumption in the logic unit 15 may possibly affect the analog circuit is described. In the situation, the first selector 14 is activated, while the second selector 17 is inactivated. In the inactivated state, the second selector 17 is fixed to a state in which the output of the logic unit 15 (digitally processed image data D5) is selected.

The operation through the generation and output of the digitally processed image data D5 by the logic unit 15 in the foregoing state is the same as described in the embodiment 1. More specifically, the selected data D4 is outputted from the first selector 14, and the logic unit 15 executes the digital processing (interpolation) such as the zoom processing to the selected data D4 to thereby generate the digitally processed image data D5.

The second selector 17 outputs digitally processed image data DB in which the digitally processed image data D5 and the effective/ineffective discrimination flag F are associated with each other to the output pad 16. The output pad 16 further outputs the digitally processed image data D8 to the external monitor or the like.

Next, an operation in thesituation in which the variation of the power consumption in the logic unit 15 is not likely to affect the analog circuit is described. In the situation, the second selector 17 is activated, while the first selector 14 is inactivated. In the inactivated state, the first selector 14 is fixed to a state in which the output of the line memory 12 (image data D2) is selected.

In the foregoing state, the second selector 17 associates the digitally processed image data D8 with the effective/ineffective discrimination flag F and outputs the result to the output pad 16, which is further outputted from the output pad 16 to the external monitor or the like in the same manner as described in the embodiment 2.

In the present embodiment, there is a little variation in the power consumption P, however, the variation is not as large as affecting the image. Whether or not the variation of the power consumption in the logic unit 15 affects the analog circuit is judged, for example, as follows. The logic unit 5 has a flag for judging if the inputted data is the effective data or ineffective data. When the judgment flag indicates the ineffective data, the signal from the line memory is halted, which generates the possibility that the power consumption is changed. Therefore, the selector 14 is switched based on the judgment flag. Further, the second selector 17 or the first selector 14 may be constantly left in the inactivated state based on a setting of a user.

EMBODIMENT 4

An embodiment 4 of the present invention relates to another mode of the dummy data generating section. The present embodiment is characterized in improving an accuracy in equalizing the power consumption by modifying the dummy data generating section.

Figure 8:
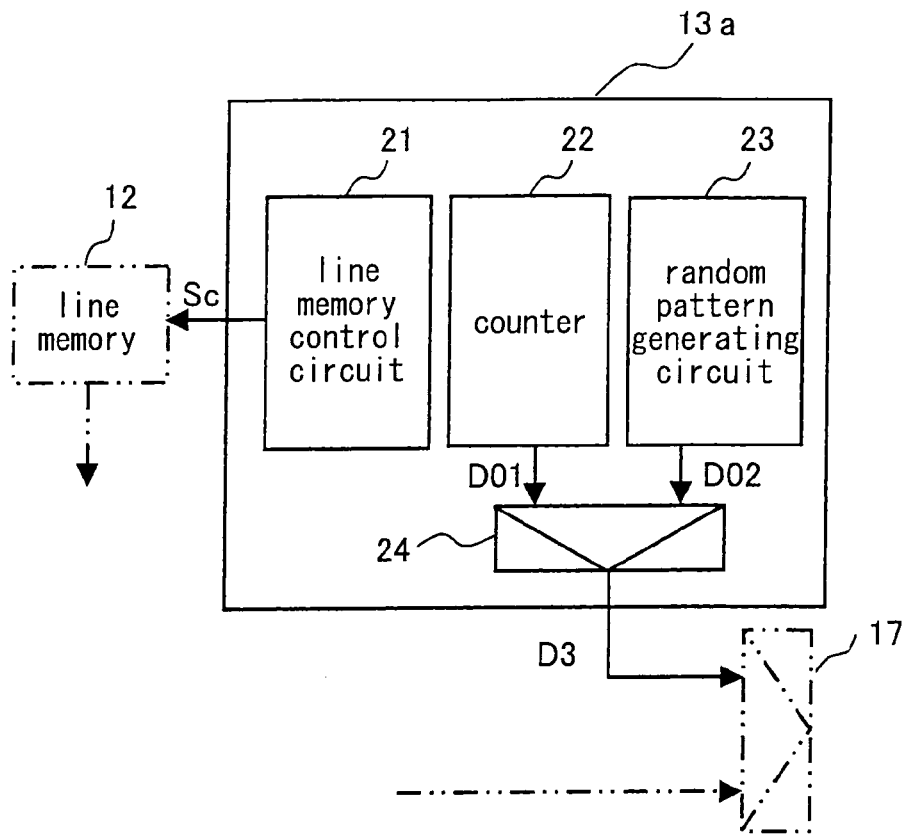
FIG. 8 is a block diagram illustrating a constitution of a dummy data generating section of an image signal processing circuit according to an embodiment 4 of the present invention.

FIG. 8 is a block diagram illustrating a constitution of a dummy data generating section 13a according to the embodiment 4. The dummy data generating section 13a comprises a line memory control circuit 21, a counter 22, a random pattern generating circuit 23 and a selector 24.

The line memory control circuit 21 outputs a control signal Sc to a line memory 12 when detecting the ineffective line output period (ineffective data region output period). The line memory 12 receives the control signal Sc and outputs the data in a previous line as the data in a current line as shown in (d1, d1), (d3, d3) and (d5, d5) in FIG. 9. Thereby, the effective data region in the same line (data region) corresponding to the two lines is consecutively outputted from the line memory 12.

The counter 22 generates an output D01 whose value is incremented or decremented over time. Because the output D01 has a redundancy, the power variation relative to the previous line is controlled to a minimum level when the output D01 is used. An output D02 outputted from the random pattern generating circuit 23 literally randomly changes. The selector 24 selects one of the output D01 of the counter 22 and the output D02 of the random pattern generating circuit 23 and outputs the selected output to the second selector 17.

In the case of separately outputting a luminance signal and a color-difference signal from the output pad 16 as the digitally processed image data via different bus lines, the output data has a redundancy. In such a case, the selector 24 selects the output D01 of the counter 22 as the dummy data D3 and outputs it to the second selector 17.

In the case of multiplexing the luminance signal and the color-difference signal and outputting the multiplexing result from the output pad 16 as the digitally processed image data via an identical bus line, the data in the adjacent lines results in signals of different bands, which includes no redundancy. In such a case, the selector 24 selects the output D02 of the random pattern generating circuit 23 as the dummy data D3 and outputs it to the second selector 17.

Any other component in the present embodiment, which is similar to the corresponding component in the embodiment 3, is simply provided with the same reference symbol and not described here again. Next, an operation of the image signal processing circuit according to the fourth embodiment constituted as described is described.

Figure 9:
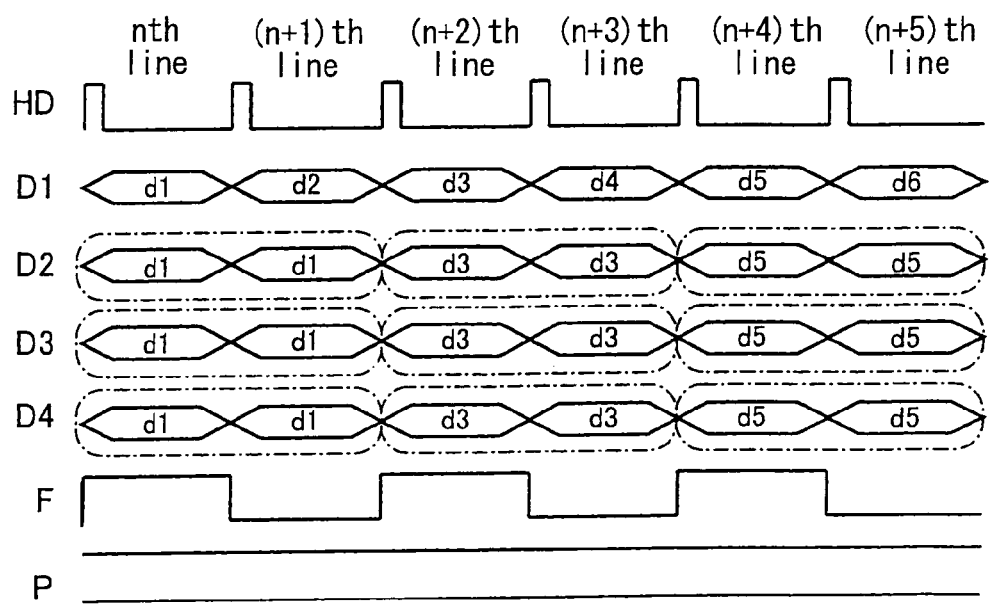
FIG. 9 is a timing chart of an operation of the image signal processing circuit according to the embodiment 4.
Figure 10:
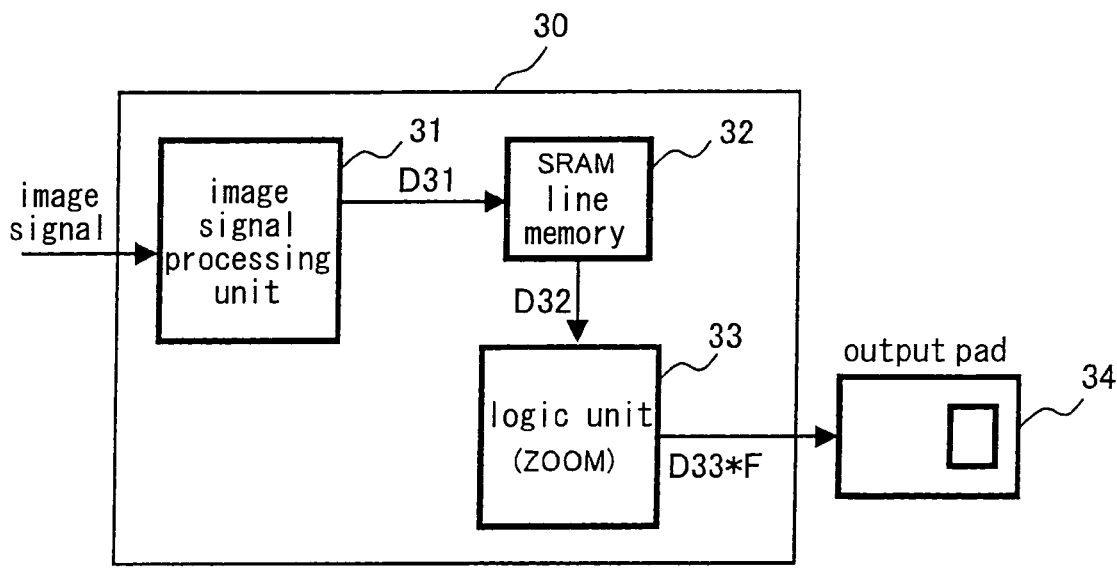
FIG. 10 is a block diagram illustrating a schematic constitution of an image signal processing circuit for executing a digital signal processing according to a conventional technology.
Figure 11:
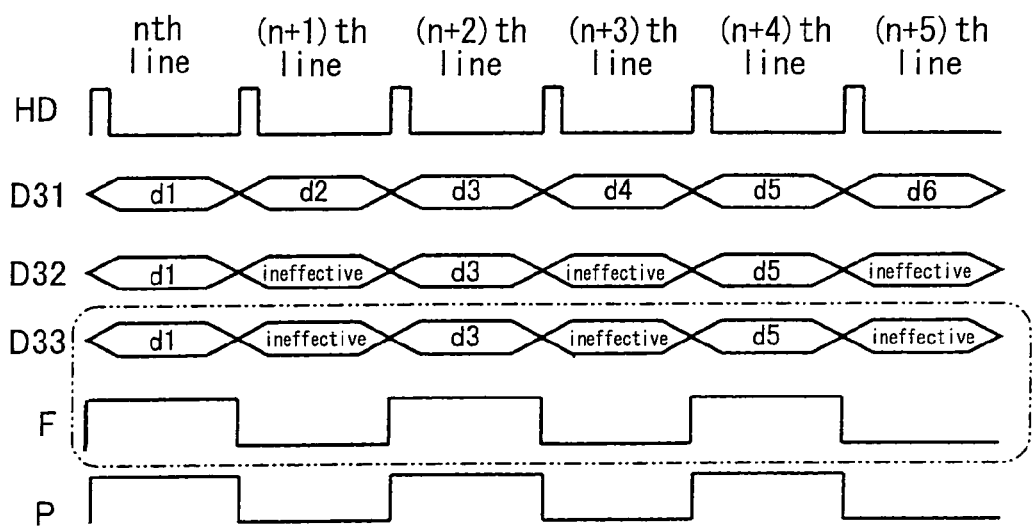
FIG. 11 is a timing chart of an operation of the image signal processing circuit according to the conventional technology.
Figure 12:
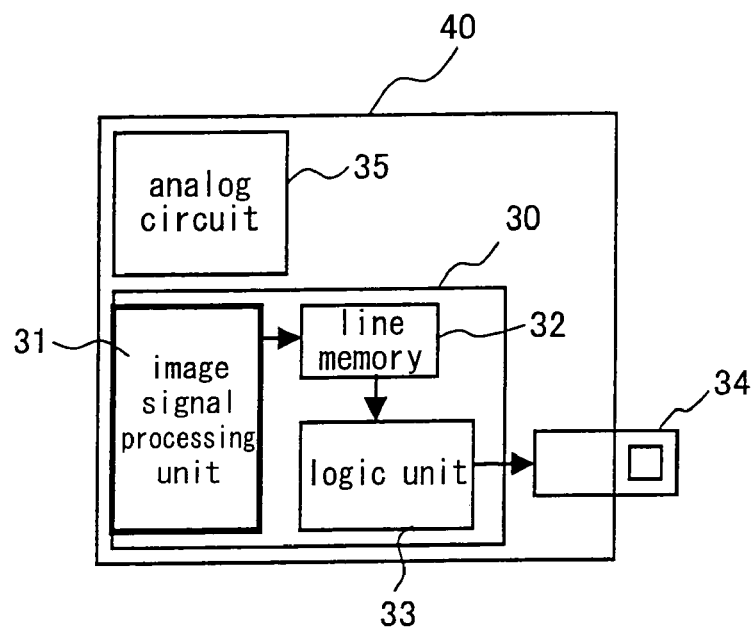
FIG. 12 is a block diagram illustrating a constitution of LSI.
Figure 13:
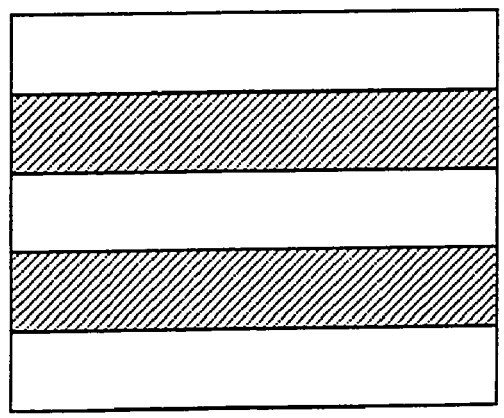
FIG. 13 is an illustration of an outputted image according to the conventional technology.

First, an operation in the situation in which the variation of the power consumption in the logic unit 15 may possibly affect the analog circuit is described. In the foregoing situation, the first selector 14 is activated in the same manner as in the embodiment 3. In the dummy data generating section 13a, the line memory control circuit 21 is activated. The activated line memory control circuit 21 controls the line memory 12 using the control signal Sc as follows when detecting the ineffective line output period (ineffective data region output period). The line memory 12 outputs the data in a previous line as the data of a current line (data region). As a result, the output data D2 of the line memory 12 results in a combination of (d1, d1), a combination of (d3, d3) and a combination of (d5, d5) as shown in FIG. 9. More specifically, the effective data region is directly adopted as the output data D2 in the effective line output period (effective data region output period), while the previous effective line (effective data region) is repeatedly adopted as the output data D2 in the ineffective line output period (ineffective data region output period). The redundancy is generated in the output data D2 (image data) thus generated, which reduces the variation of the image data in the adjacent lines.

As described, according to the present invention, the image data in the previous effective line is directly adopted as the dummy pattern of the ineffective line, which effectively promotes the equalization of the power consumption.

In the same manner as in the embodiment 3, the counter 22, the random pattern generating circuit 23 and the selector 24 in the dummy data generating section 13a are activated in the operation in which the second selector 17 is activated. In the case of separately outputting the luminance signal and the color-difference signal from the output pad 16 via the different bus lines in the foregoing situation, the selector 24 selects the output D01 of the counter 22 as the dummy data D3 and output it to the second selector 17. Thereby, the variation of the power consumption can be minimized.

In the case of multiplexing the luminance signal and the color-difference signal and outputting the multiplexing result from the output pad 16 via the same bus line, the selector 24 selects the output D02 of the random pattern generating circuit 23 as the dummy data D3 and outputs it to the second selector 17. Thereby, the variation of the power consumption can be minimized.

According to the synergetic effect described above, the power consumption can be more accurately equalized. Which of the counter 22 and the random pattern generating circuit 23 is used can be determined by the user (assembly maker) depending on an entire system constitution. Of the combination of the line memory control circuit 21 and the counter 22—random pattern generating circuit 23—selector 24, either may be omitted. Further, any other component having the equivalent function may be adopted.

In the foregoing description, the zoom circuit was referred to as an example, however, the dummy generating circuit and the selector may execute the same processing in a blanking period of the imaging signal outputted from the image sensor.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An image signal processing circuit comprising:
   an image signal processing unit for generating image data from an inputted image signal;
   a line memory for temporarily memorizing the image data per line and outputting the memorized image data while switching to and from effective and ineffective;
   a logic unit for digital-processing the image data outputted from the line memory and generating digitally processed image data;
   an output pad for outputting the digitally processed image data; and
   a data replacing unit for generating dummy data and replacing data in a data region set as ineffective by the line memory among the image data outputted from the line memory or the digitally processed image data outputted from the logic unit with the dummy data, wherein the data replacing unit comprises:
   a dummy data generating section for generating the dummy data;
   a first selector for selecting the image data outputted from the line memory during the effective data region output period of the image data and outputting the selected image data to the logic unit, the first selector further selecting the dummy data during an ineffective data region output period of the image data and outputting the selected dummy data to the logic unit; and
   a second selector for selecting the digitally processed image data outputted from the logic unit during an effective data region output period of the digitally processed image data and outputting the selected digitally processed image data to the output pad, the second selector further selecting the dummy data during an ineffective data region output period of the digitally processed image data and outputting the selected dummy data to the output pad, wherein
   in a state in which the operation of one of the first and second selectors is activated, the operation of the other is fixed to a state in which the image data or the digitally processed image data is outputted.

2. An image signal processing circuit as claimed in claim 1, wherein the line memory outputs the image data while switching to and from effective and ineffective per line.

3. An image signal processing circuit as claimed in claim 2, further comprising a line memory control circuit, wherein the line memory control circuit controls the output of the line memory so that the image data in an effective data region output period is interpolated by the image data in an ineffective data region output period.

4. An image signal processing circuit as claimed in claim 1, wherein
   the dummy data generating section comprises:
   a random pattern generating circuit for generating a random pattern;
   a counter for serially incrementing or decrementing a value; and
   a selector for selecting one of an output of the random pattern generating circuit and an output of the counter and outputting the selected output as the dummy data.

5. An image signal processing circuit as claimed in claim 1, wherein
   the digitally processed image data includes an effective/ineffective discrimination flag.

6. An image signal processing circuit as claimed in claim 1, wherein
   the logic unit comprises an image enlarging/reducing function through the digital processing.

7. An image signal processing circuit as claimed in claim 1, wherein
   the line memory sets an ineffective data region output period of the image data including a blanking period.

8. An image signal processing circuit as claimed in claim 1, wherein in the case of separately outputting a luminance signal and a color-difference signal from the output pad, the third selector outputs the output of the counter as the dummy data to the second selector, and
   wherein in the case of multiplexing the luminance signal and the color-difference signal and outputting the multiplexing result from the output pad, the third selector outputs the output of the random pattern generating circuit as the dummy data to the second selector.

* * * * *